United States Patent [19]
Kuramoto et al.

[11] 3,963,507
[45] June 15, 1976

[54] FOAM-CONTAINING SLURRY TO MAKE POROUS, INORGANIC CONSTRUCTION MATERIAL

[75] Inventors: Naoya Kuramoto, Hachioji; Hachiro Saito, Hino; Wataru Yamamoto, Hachioji, all of Japan

[73] Assignee: Teijin Limited, Osaka, Japan

[22] Filed: May 22, 1974

[21] Appl. No.: 472,198

[30] Foreign Application Priority Data
May 29, 1973   Japan.................................. 48-59313

[52] U.S. Cl.................................. 106/86; 106/88; 106/93; 106/120
[51] Int. Cl.² .................... C04B 7/02; C04B 7/353; C04B 15/06
[58] Field of Search ................. 106/86, 88, 93, 120; 260/29.6 S

[56] References Cited
UNITED STATES PATENTS

| | | | |
|---|---|---|---|
| 3,030,258 | 4/1962 | Wagner | 106/93 |
| 3,243,307 | 3/1966 | Selden | 106/93 |
| 3,824,107 | 7/1974 | Weiant | 106/93 |

*Primary Examiner*—J. Poer
*Attorney, Agent, or Firm*—Sherman & Shalloway

[57] ABSTRACT

Foam-containing slurry for making porous, inorganic construction material composed of 100 parts by weight of water [I], 35 to 350 parts by weight of hydraulic substance [II], and 0.02 to 1.20 parts of foaming agent [III], the foaming agent [III] comprising (1) as the foaming component, 0.05 to 20 parts by weight of water-soluble, low-viscosity cellulose derivatives, (2) as the foam stabilizer, 1 part by weight of water-soluble, high-viscosity cellulose derivatives, and (3) as the foaming accelerator, at least 1 part by weight of at least 75% saponified polyvinyl alcohol.

12 Claims, No Drawings

FOAM-CONTAINING SLURRY TO MAKE POROUS, INORGANIC CONSTRUCTION MATERIAL

This invention relates to a foam-containing slurry for making porous, inorganic construction material. More particularly, the invention relates to a foam-containing slurry suited to make inorganic construction material of high strength and beautiful appearance in which more uniform and finer foams are evenly distributed compared with conventional porous, inorganic construction material.

Heretofore known methods for making porous, inorganic construction material by introducing fine foams thereinto may be divided into two broad classes. One is to mix a gas-generating agent as finely divided aluminium metal with a hydraulic substance such as cement, and cause foaming by adding water to the mixture. The other is to add casein, albumin, or the like, which are normally referred to as the foaming agent, to mortar, and cause foaming by agitation.

The former system employing the gas-generating agent such as aluminium metal powder has many processing problems, e.g., uniform mixing of metal powder with mortar is difficult, the metal powder is apt to spatter about to pollute the environment and endanger human health, and the product construction material lacks uniformity in the foam distribution. The latter system employing a foaming agent such as casein, albumin, or the like, is free from those problems, but fine and stable foams of a uniform size are difficult to form in cement slurry, and the foams are apt to join each other to make larger size foams, and in extreme cases the foams collapse or escape into the atmosphere to occasionally cause separation of the slurry layer and the foams. Thus a hardened product in which the foams are uniformly distributed in the vertical direction cannot be obtained. In certain cases the process becomes entirely inoperable.

The object of the present invention, therefore, is to provide a process which is free from such objectionable phenomena, and can produce porous, inoganic construction material of excellent appearance and high strength, containing fine foams uniformly distributed therein.

We discovered that the above object of this invention is accomplished by using a foaming mortar containing, at specific ratios, specific water-soluble, low-viscosity cellulose derivatives, specific water-soluble, high-viscosity cellulose derivatives, and furthermore a specific type of polyvinyl alcohol, as the starting material of the porous, inorganic construction material.

According to the invention, therefore, a foam-containing alurry for making porous, inorganic construction material is provided, which is characteristically composed of

[I] 100 weight parts of water,
[II] 35 to 350 weight parts of hydraulic substance, and
[III] 0.02 to 1.20, preferably 0.1 to 1.0, part by weight of a foaming agent.

The foaming agent [III] consists essentially of 1. as the foaming component, 0.05 to 20, preferably 0.1 to 10, parts by weight of a water-soluble, low-viscosity cellulose derivative having a viscosity at 20°C. of 25 – 2,000, preferably 100 – 2,000, centipoises as 2 wt % aqueous solution.
2. as the foam stabilizer, 1 part by weight of a water-soluble, high-viscosity cellulose derivative, of which 2 wt % aqueous solution has a viscosity at 20°C. of more than 2,000 centipoises, preferably more than 4,000 centipoises, and
3. as the foaming accelerator, at least 1 part, preferably 1 to 30 parts, particularly 1 to 10 parts, by weight of at least 75 % saponified, more preferably at least 85% saponified polyvinyl alcohol, of which 4 wt % aqueous solution has a viscosity at 20°C. of not higher than 70 centipoises.

As examples of the water-soluble, low-viscosity cellulose derivatives (1) serving as the foaming component according to the present invention, methyl cellulose, ethyl methyl cellulose, ethyl cellulose, hydroxyethyl methyl cellulose, hydroxypropyl methyl cellulose, hydroxyethyl ethyl cellulose, and the like can be suitably used because of their excellent foaming property originating from their surface activity, as well as high foam stability due to their appropriate viscosity. Of the above-mentioned cellulose derivatives, particularly methyl cellulose, hydroxyethyl methyl cellulose, and hydroxypropyl methyl cellulose can be advantageously used because they show good foam stability and are economical. When the cellulose derivatives of which 2 wt % aqueous solution has a viscosity below 25 centipoises at 20°C. are used, the porous construction material of uniform structure cannot be obtained, because when the aqueous slurry of hydraulic substance containing such cellulose derivatives is foamed foams tend to join each other to render the foam sizes nonuniform, or the foams are apt to collapse to render the slurry heterogeneous. Whereas, if the cellulose derivatives having the above-defined viscosity of higher than 2,000 centipoises are used, the foaming property is impaired, and occasionally complete foaming becomes impossible even by prolonged foaming procedures.

Suitable examples of the water-soluble, high-viscosity cellulose derivatives (2) acting as the foam stabilizer according to the invention include methyl cellulose, ethyl methyl cellulose, ethyl cellulose, hydroxyethyl methyl cellulose, hydroxypropyl methyl cellulose hydroxyethyl ethyl cellulose, carboxymethyl cellulose, and the like, particularly methyl cellulose, hydroxyethyl methyl cellulose, and hydroxypropyl methyl cellulose being preferred. When the cellulose derivatives having the viscosities lower than 2,000 centipoises as measured with 2 % aqueous solution at 20°C. are used as the foam stabilizer, stability of the foams is impaired, i.e., the foams tend to vanish, or easily join or collapse to render the slurry unstable. Thus the object porous construction materials of uniform structure can hardly be obtained.

The polyvinyl alcohol (3) already specified shows suitable surface activity and sufficiently low viscosity in the form of aqueous solution, and consequently effectively acts as the foaming accelerator according to the invention. Polyvinyl alcohols having the degree of saponification lower than 75% low hydrophilic property, gel easily at high temperatures, and furthermore show the deficiency of low affinity with the above-mentioned cellulose derivatives (1) and (2). Such low affinity means that the foaming solution containing the low-viscosity cellulose derivatives (1), high-viscosity cellulose derivatives (2), and the lowly saponified polyvinyl alcohol is apt to cause phase separation during its storage as the raw batch for making the foam-containing slurry.

The quantitative ratio by weight among the low-viscosity cellulose derivatives (1), high-viscosity cellulose derivatives (2), and the polyvinyl alcohol (3), is indeed an important factor for well balancing the foaming property and foam stability and improving the slurry stability to obtain the high strength porous construction material in which the fine and uniform size foams are homogeneously distributed. In order to accomplish the intended effect, the solution must contain 0.05–20, preferably 0.1 to 10, parts by weight of the low-viscosity cellulose derivatives (1) and at least 1, preferably 1 to 30, inter alia, 1 to 10, parts by weight of the polyvinyl alcohol (3), per part by weight of the high-viscosity cellulose derivatives (2) as aforesaid. When the ratio of the low-viscosity cellulose derivatives (1) is either less than 0.05 part by weight or more than 20 parts by weight, the foam stability of the slurry becomes poor, and the high performance porous inorganic construction material can never be obtained. Again, if the specified ratio of the polyvinyl alcohol (3) is less than 1 part by weight, the foaming property of the composition becomes unsatisfactory, and the required amount of foams cannot be obtained even through many hours of foaming procedures. Thus the preparation of porous, inorganic construction material of high performance is impossible.

The foam-containing slurry according to the invention can be prepared by various methods, examples of which follow:

i. The foaming solution containing the foaming component, foam stabilizer and foaming accelerator may be added to an aqueous slurry of a hydraulic substance, and stirred.

ii. Conversely, the aqueous slurry of the hydraulic substance may be added to the foaming solution and stirred.

iii. The foaming solution may be stirred and foamed, and the resulting foamed liquid is added to the aqueous slurry of the hydraulic substance and stirred.

iv. Conversely, the aqueous slurry of the hydraulic substance may be added to the formed liquid and stirred.

v. The foaming component, foam stabilizer, foaming accelerator, hydraulic substance, and water are mixed all at once and stirred.

The stirring can be effected by means known per se, such as violent stirring in the tank with stirring blades, which exhibits high stirring efficiency and high air-entraining ability. Alternatively, the stirring may be effected while air is forcibly blown into the tank from outside. The foaming volume can be controlled in addition to suitably selecting the types and quantities of the foaming component, foam stabilizer, and foaming accelerator, by optionally varying such factors as the amount of water, agitation rate, and feed rate of the gas such as air.

The foaming solution containing the foaming component, foam stabilizer, and foaming accelerator, which is used in the above-described methods (i) through (iv), can be prepared, for instance, by mixing the aqueous solutions each containing the foaming component, foam stabilizer, and the foaming accelerator or by dissolving the above three components while gradually pouring them with stirring at a time or in a suitable sequence into water held at a suitable temperature. While obviously the foaming solution so prepared can be immediately used, it may be stored for a prolonged period with no sign of gathering mold, decomposition, or degeneration. Neither the stability nor hardening properties of the slurry is in any way impaired during long storage. It is particularly advantageous for large, industrial scale production of porous construction materials, to mass-produce a thick foaming solution in advance, and to take out from the stock each required amount for the individual occasion. The thick solution is to be diluted before use.

The foam-containing slurry according to the invention should contain, besides 100 parts of water and 35 to 350 parts of a hydraulic substance, 0.02 to 1.20, preferably 0.1 to 1.0, part of the foaming agent, i.e., the total sum of the already described foaming component (1), foam stabilizer (2), and foaming accelerator (3), all parts being by weight. If the content of foaming agent in the slurry is less than the lower limit set forth above, satisfactory foaming property is difficult to be obtained, and relatively longer period of foaming operation is required. Furthermore, if completely foamed, the foams exhibit reduced stability, which renders the production of high quality porous inorganic construction material difficult. Use of the foaming agent in a quantity exceeding the above upper limit should be avoided mainly from economical reasons.

The specific gravity of the porous, inorganic construction material made from the foam-containing slurry according to the invention can be easily controlled by regulating the amount of foams in the slurry. The amount of foams in turn can be easily controlled by varying the amount of foaming agent, in other words, by varying the amount of the foaming solution.

The hydraulic substance referred to in this invention means those substances which have the property of undergoing a hydration reaction when mixed with water, to be hardened. Typical examples of such substances are portland cement and alumina cement, which show the hydraulic property at room temperature within relatively short period. Those substances with which the hydration reaction progresses very slowly and consequently require many hours for their hardening, such as blast furnace slag, and those showing the hydraulic property only at high temperatures and high pressures, e.g., 180°C. and 10 atmospheres, such as the mixture of siliceous sand and quick lime, are also within the scope of "hydraulc substances" useful for the subject invention.

The foam-containing slurry of the invention can contain, besides the aforementioned essential components, i.e., water, the hydraulic substance, and foaming agent, other known additives in the amounts conventionally employed. Examples of such additives include: rapid-hardening agent such as caustic soda, calcium chloride, etc.; light-weight aggregate such as vermiculite, expansive paigeite, fine, hollow spheroids (microballoon or microsphere), etc.; aggregate such as sand, gravel, etc.; reinforcing agent such as glass fiber, steel fiber, asbestos, nylon fiber, polypropylene fiber, polyvinyl alcohol fiber, polyvinyl chloride fiber, hemp, etc.; coloring agent such as pigment; surfactant such as resined soap, protein hydrolyzate, synthetic surface active agent, high molecular surface active agents, etc.; and viscosity-increasing agent such as sodium alginate, sodium polyacrylate, sodium polymethacrylate, polyacrylamide, gelatin, starch, dextrin, rubber latex, water glass, etc.

Incidentally, the viscosities of the water-soluble, low-viscosity cellulose derivatives (1) and of the water-soluble, high-viscosity cellulose derivatives (2) according to the invention are determined as follows: 10 grams of the sample powder precisely measured by dry weight is taken and mixed with 490 cc of warm water, and the mixture is cooled to 5°C. in an aqueous bath under slow agitation. The stirring is continued until the powder is completely dissolved, to form a 2 wt % aqueous solution. The solution is kept in a thermostat of 20°C. ±0.1°C. until thermal equilibrium is reached, and its viscosity measured. The type of viscometer employed depending on the anticipated viscosity, i.e., if it is expected to be below approximately 100 cps, an Ubbelohde's viscometer is used, and for higher viscosities, BM-type rotation viscometer (produced by Kabushiki Kaisha Tokyo Keiki) is used. In the former case, the rating of the capillary tube diameter employed in the viscometer is varied depending on the anticipated viscosity. That is, for high viscosities, capillary tubes of greater sizes are used. In the latter case, the rotor No. and rpm of the rotor are suitably selected depending on the viscosity, and the indicator is read three minutes after the rotor began to rotate. The viscosity is determined by multiplying the read value by the predetermined coefficient.

Summarizing the foregoing, the merits of the invention may be enumerated as follows:

1. All of the foaming component, foam stabilizer, and foaming accelerator to be employed are easily available.
2. The foaming solution can be easily prepared from those materials.
3. The foaming solution can be stored for long periods with no deterioration.
4. Porous, inorganic construction material of optional specific gravity can be readily made from the foam-containing slurry of the invention.
5. With the foam-containing slurry of this invention, molding height can be increased to enable the preparation of porous, inorganic construction materials at high productivity.
6. The porous, inorganic construction material made from the foam-containing slurry of the invention contains fine foams uniformly distributed therein, exhibits high strength, and has beautiful appearance.
7. The invention is applicable not only to the preparation of porous construction material of ordinary cement which hardens at room temperature, but also to that of so-called ALC construction material which hardens only at high temperatures and pressures.

Hereinafter the invention will be explained more specifically, with reference to the following non-limitative Examples.

In the Examples, the foaming property is indicated by the maximum volume (liter) of the foamed liquid immediately after subjecting 2,000 cc of the sample foaming solution to 2 minutes' stirring at 250 rpm in a water tank with a specific stirring blade.

Also the foam stability is indicated by the ratio (%) of the volume of the same foamed liquid measured 30 minutes after the above foaming procedure, to the above maximum volume.

Both the slurry stability and product's homogeneity are indicated by a circle sign (O) when fine foams are uniformly distributed throughout the sample, or by (X) mark when the foam sizes are appreciably uneven to the naked eye, and the foam distribution in non-uniform (foams are localized to upper part and relatively greater part of the hydraulic substance is sedimented to the lower part).

Unless otherwise specified, the parts and percentages given in the Examples are by weight.

EXAMPLE 1

A foaming solution was prepared by dissolving a methyl cellulose (1) of 400 cps, methyl cellulose (2) of 8,000 cps, and a 90% saponified polyvinyl alcohol (3) having a viscosity of 5 cps as a 4 % aqueous solution at 20°C., in water, to the concentrations of, respectively, 0.135%, 0.054%, and 0.135%. Consequently, the weight ratio of the above components (1), (2), and (3) contained in the foaming solution was 2.5 : 1 : 2.5.

Separately, 5.0 Kg of portland cement and 1.0 Kg of sand (diameters not exceeding 0.5 mm) were mixed for 5 minutes in a mortar mixer 3,000 cc of water was added to the mixture further, and the whole system was thoroughly stirred thereby converted into a homogeneous slurry.

A kneading tank provided with a stirring blade was charged with 2,000 cc of the above foaming solution which was then foamed by stirring at 250 rpm for 2 minutes. Thereafter the above slurry was poured into the tank, and the system was stirred until a homogeneous, foam-containing slurry was obtained. The slurry contained, per 100 parts of water, 100 parts of the cement and 0.13 part of the foaming agent (sum of the afore-specified (1), (2), and (3)).

The foam-containing slurry was rich in fluidity, and fine foams were uniformly distributed throughout. The same slurry was poured into a 10 $\phi$ × 60 cm cylindrical mold, and hardened. The hardened body was aged for 28 days at 20°C. and a relative humidity of 65%. It was observed that fine foams were uniformly dispersed in the body, and substantially no difference in specific gravity was observed along the vertical direction of molding. (The specific gravity at 10 cm below the top was 0.49, and that at 10 cm above the bottom was 0.50.) The hardened body also showed a compressive strength of 34 Kg/cm$^2$.

EXAMPLE 2

As the hydraulic substance, 3.4 Kg of siliceous sand, 1.5 Kg of quick lime, and 1.2 Kg of portland cement were kneaded with 2,500 cc of water to form a homogeneous slurry.

The above slurry was poured and mixed thoroughly with the foaming solution of Example 1 which was foamed through the identical procedure as in Example 1. The resulting foam-containing slurry contained, per 100 parts of water, 136 parts of the hydraulic substance, and 0.144 part of the foaming agent.

The foam-containing slurry was poured into a cylindrical mold of 10 $\phi$ × 60 cm in size, and pre-cured, was subsequently completely hardened by hydrothermal reaction at 180°C. under a pressure of 10 Kg/cm$^2$. The product contained fine foams uniformly distributed throughout the hardened body, and showed no substantial difference in specific gravity in the vertical direction. (The specific gravity at 10 cm below the top was 0.51, and that at 10 cm above the bottom was 0.52.) The hardened body also had a beautiful appearance, and a compressive strenth of 45 Kg/cm$^2$.

Control

A foaming solution was formed by dissolving a methyl cellulose having a viscosity of 1,500 cps and the same polyvinyl alcohol as that employed in Example 1, in water each to the concentration of, respectively, 0.29% and 0.135%. The foaming solution thus formed as a control had the same viscosity as that of the foaming solution of Example 1.

the ingredients (1), (2), and (3) in the solutions was in all cases 2.5 : 1 : 2.5.

The results of measuring the foaming property and foam stability of those solutions are also given in Table 1.

Table 1

| Foaming Solution | | | Foaming property (l) | Foam Stability (%) |
|---|---|---|---|---|
| Foaming Component (1) | Foam Stabilizer (2) | Foaming Accelerator (3) | | |
| Methyl cellulose (400 cps) | Methyl cellulose (8,000 cps) | 90% saponified polyvinyl alcohol | 31 | 98.1 |
| Ethyl cellulose (400 cps) | do. | do. | 30 | 96.8 |
| Hydroxyethyl methyl cellulose (400 cps) | do. | do. | 30 | 97.3 |
| Hydroxypropyl methyl cellulose (400 cps) | do. | do. | 30 | 96.1 |
| Hydroxyethyl ethyl cellulose (400 cps) | do. | do. | 29 | 96.5 |
| Methyl cellulose (400 cps) | Methyl cellulose (4,000 cps) | do. | 32 | 95.0 |
| do. | Methyl cellulose (4,000 cps) | do. | 31 | 94.2 |
| do. | Hydroxyethyl methyl cellulose (4,000 cps) | do. | 31 | 94.0 |
| do. | Hydroxypropyl methyl cellulose (4,000 cps) | do. | 31 | 94.5 |
| do. | Hydroxyethyl ethyl cellulose (4,000 cps) | do. | 30 | 93.7 |
| do. | Carboxymethyl cellulose (4,000 cps) | do. | 27 | 89.3 |

Upon measuring the foaming property and foam stability, the foaming solution of Example 1 was found to have those of, respectively, 31 liters and 98.1%. In contrast, the control solution had only the foaming property of 26 liters and the foam stability of 91.3%.

The hardened body formed following the procedures of Example 1 but using the control foaming solution had a compressive strength of 30 Kg/cm$^2$, while the product of Example 1 had a compressive strength of 34 Kg/cm$^2$.

From these results, it can be understood that in order to obtain the homogeneous and high performance porous inorganic construction material, the foaming solution must contain the specified three ingredients, i.e., the low-viscosity cellulose derivatives (1), high-viscosity cellulose derivatives (2), and the polyvinyl alcohol (3).

EXAMPLE 3

Various foaming solutions were formed by dissolving in water low-viscosity (400 cps) cellulose derivative (1) as the foaming component, high-viscosity (8,000 or 4,000 cps) cellulose derivative (2) as the foam stabilizer, and the same polyvinyl alcohol (3) as that used in Example 1 as the foaming accelerator, each at a concentration of, respectively, 0.135 %, 0.054%, and 0.135%. The ingredients in each of the foaming solutions are specified in Table 1 below. The weight ratio of

EXAMPLE 4

Various foaming solutions were formed by dissolving the low-viscosity cellulose derivatives (1) as the foaming component, high-viscosity cellulose derivative (2) as the foam stabilizer, and the same polyvinyl alcohol (3) used in Example 1 as the foaming accelerator, in water, each at a concentration of, respectively, 0.135 %, 0.054 %, and 0.135 %. Every solution contained the three ingredients at the weight ratio of 2.5 : 1 : 2.5. The ingredients used were as specified in Table 2.

The foaming property and foam stability were determined as to each of the foaming solutions, with the results as also given in Table 2.

The foaming solutions were used to make the foam-containing slurries in the manner similar to Example 1, each slurry containing, per 100 parts of water, 100 parts of portland cement and 0.13 part of the foaming agent.

Then the foam-containing slurries were used to make the mortar-hardened bodies. The results of observing the slurry stability, product's homogeneity and measuring the compressive strength of each hardened body were as shown also in Table 2.

From the results it can be understood that when the viscosity of either the foaming component or the foam stabilizer deviates from the specified range, the hardened body exhibits inferior homogeneity of structure and consequently, low compressive strength.

Table 2

| | Foaming Solution | | | Foaming Property (l) | Foam Stability (%) | Slurry Stability | Product's Homogeneity | Compressive Strength (Kg/cm$^2$) |
|---|---|---|---|---|---|---|---|---|
| | Foaming component (1) | Foam stabilizer (2) | Foaming accelerator (3) | | | | | |
| This Invention | MC (400 cps) | MC (8,000 cps) | 90% saponified PVA | 31 | 98.1 | 0 | 0 | 34 |
| | do. | HPMC(15,000 cps) | do. | 31 | 98.2 | 0 | 0 | 34 |
| | HPMC(400 cps) | MC (8,000 cps) | do. | 30 | 97.4 | 0 | 0 | 33 |
| | do. | HPMC(15,000 cps) | do. | 30 | 97.2 | 0 | 0 | 34 |
| | MC (15 cps) | MC (8,000 cps) | do. | 29 | 73.1 | x | x | 25 |
| | do. | HPMC(15,000 cps) | do. | 29 | 74.5 | x | x | 26 |
| | MC (3000 cps) | MC (8,000 cps) | do. | 24 | 97.6 | x | x | 31 |

Table 2-continued

|  | Foaming Solution | | | Foaming Property (1) | Foam Stability (%) | Slurry Stability | Product's Homogeneity | Compressive Strength (Kg/cm²) |
|---|---|---|---|---|---|---|---|---|
|  | Foaming component (1) | Foam stabilizer (2) | Foaming accelerator (3) | | | | | |
| Control | do. | HPMC(15,000 cps) | do. | 25 | 96.9 | x | x | 30 |
|  | HPMC(3,000 cps) | MC (8,000 cps) | do. | 21 | 96.5 | x | x | 30 |
|  | do. | HPMC(15,000 cps) | do. | 20 | 97.0 | x | x | 28 |
|  | MC (400 cps) | MC (1,500 cps) | do. | 32 | 74.5 | x | x | 26 |
|  | do. | HPMC(1,500 cps) | do. | 32 | 71.7 | x | x | 24 |
|  | HPMC(400 cps) | MC (1,500 cps) | do. | 30 | 70.6 | x | x | 24 |
|  | do. | HPMC(1,500 cps) | do. | 29 | 70.0 | x | x | 25 |

Note:
MC = methyl cellulose
HPMC = hydroxypropyl methyl cellulose
PVA = polyvinyl alcohol

EXAMPLE 5

A foaming solution was prepared by dissolving a low-viscosity methyl cellulose (1) as the foaming component, a high-viscosity methyl cellulose (2) as the foam stabilizer, and the same 90% saponified polyvinyl alcohol (3) as that employed in Example 1 as the foaming accelerator, in water, each to the concentration of, respectively, 0.135 %, 0.054%, and 0.135%. The solution thus contained the three ingredients at the weight ratio of 2.5 : 1 : 2.5.

By way of a control, another foaming solution was formed from the same ingredients in the identical manner, except that the polyvinyl alcohol (3) was replaced by a 70 % saponified polyvinyl alcohol of which 4% aqueous solution had a viscosity of 5 cps at 20°C.

The foaming property, foam stability, and storage stability at 20°C. were determined as to the above two foaming solutions, with the results as shown in Table 3.

Table 3

|  | Foaming Solution | | | Foaming property (1) | Foam Stability (%) | Storage Stability |
|---|---|---|---|---|---|---|
|  | Foaming component (1) | Foam Stabilizer (2) | Foaming Accelerator (3) | | | |
| This Invention | Methyl cellulose (400 cps) | Methyl cellulose (8,000 cps) | 90% saponified polyvinyl alcohol | 31 | 98.1 | No change |
| Control | do. | do. | 70% saponified polyvinyl alcohol | 32 | 98.0 | Separated into two phases after 12 hours (upper phase: methyl cellulose lower phase: polyvinyl alcohol) |

From the data in Table 3 above, it can be understood that when the degree of saponification of the polyvinyl alcohol deviates from the range specified by this invention, the foaming solution becomes unstable like the control solution, and its storage stability is too low to be industrially practicable.

EXAMPLE 6

Various foaming solutions containing a low-viscosity methyl cellulose (1) having the viscosity of 400 cps, a high-viscosity methyl cellulose (2) of 8,000 cps, and the same 90% saponified polyvinyl alcohol as that employed in Example 1, at the ratios each specified in Table 4 were prepared. The content of the foaming agent, i.e., total sum of above ingredients (1), (2), and (3) in the solutions was invariably 0.46%.

The foaming property and foam stability were measured as to each of those solutions, with the results as indicated in Table 4.

The foaming solutions were used to make foam-containing slurries in the manner similar to Example 1. In all cases, the foam-containing slurry contained, per 100 parts of water, 100 parts of portland cement and 0.18 part of foaming agent. The foam-containing slurries were then molded into mortar hardened bodies. The results of observing the slurry stability and product's homogeneity, as well as of measuring the compressive strength of each hardened body were as shown also in Table 4.

From the data given in Table 4, it can be understood that when the ratio among the low-viscosity cellulose derivatives, high-viscosity cellulose derivatives, and the polyvinyl alcohol, contained in the foaming solution deviates from the range specified in this invention, only the hardened bodies of inferior homogeneity in structure, and consequently low compressive strength, are obtained.

Table 4

|  | Weight Ratio | | | Foaming Property (1) | Foam Stability (%) | Slurry Stability | Product's Homogeneity | Compressive Strength (Kg/cm²) |
|---|---|---|---|---|---|---|---|---|
|  | Low-viscosity methyl cellulose (400 cps) | High-viscosity methyl cellulose (8,000 cps) | Polyvinyl alcohol (90% saponified) | | | | | |
|  | 0.07 | 1 | 1.5 | 24 | 98.4 | o | o | 30 |
|  | 0.1 | 1 | 1.6 | 27 | 97.5 | o | o | 30 |
|  | 0.2 | 1 | 1.7 | 29 | 98.5 | o | o | 32 |
| This | 2.5 | 1 | 5 | 32 | 98.3 | o | o | 34 |
| Invention | 10 | 1 | 16 | 31 | 96.0 | o | o | 34 |
|  | 15 | 1 | 23 | 30 | 93.7 | o | o | 33 |
|  | 18 | 1 | 27 | 30 | 90.2 | o | o | 31 |
| Control | 0.04 | 1 | 1.5 | 21 | 94.7 | x | x | 27 |
|  | 25 | 1 | 39 | 30 | 68.2 | x | x | 23 |

EXAMPLE 7

Various foaming solutions containing a low-viscosity methyl cellulose of 400 cps, a high-viscosity methyl cellulose of 8,000 cps, and the same 90% saponified polyvinyl alcohol as that employed in Example 1, at the ratios each specified in Table 5 were prepared.

The foaming property and foam stability were measured as to each of the solutions, with the results as shown in Table 5.

The foaming solutions were used to make foam-containing slurries in the manner similar to Example 1. Each of the slurries contained, per 100 parts of water, 100 parts of portland cement, and the foaming agent of the amount specified in Table 5. Then the foam-containing slurries were used to make mortar-hardened bodies. The results of observing the slurry stability and product's homogeneity, and measuring the compressive strength of the hardened bodies were as given in Table 5.

From the results of Table 5, it can be understood that when the ratio of the ingredients contained in the foaming solution deviates from the specified range of this invention, hardened bodies of inferior homogeneity, and consequently low compressive strength, only are obtainable.

Table 5

|  | Composition of Foaming Agent | | | Concentration of Foaming Agent in Foaming solution (%) | Foaming Property (1) | Foam Stability (%) | Foaming Agent per 100 Parts of Water in Slurry (part) | Slurry Stability | Product's Homogeneity | Compressive Strength (Kg/cm²) |
|---|---|---|---|---|---|---|---|---|---|---|
|  | Low-viscosity methyl cellulose (400 cps) | High-viscosity methyl cellulose (8,000 cps) | Polyvinyl alcohol (90% saponified) | | | | | | | |
|  | 2.5 | 1 | 1.3 | 0.26 | 28 | 98.2 | 0.10 | o | o | 31 |
|  | 2.5 | 1 | 2.8 | 0.34 | 32 | 98.4 | 0.14 | o | o | 34 |
| This | 2.5 | 1 | 4.1 | 0.41 | 33 | 98.3 | 0.16 | o | o | 34 |
| Invention | 2.5 | 1 | 5.6 | 0.49 | 33 | 98.4 | 0.20 | o | o | 33 |
|  | 2.5 | 1 | 6.5 | 0.54 | 34 | 98.6 | 0.22 | o | o | 34 |
|  | 2.5 | 1 | 8.3 | 0.64 | 34 | 98.5 | 0.26 | o | o | 32 |
|  | 2.5 | 1 | 27 | 1.65 | 33 | 98.8 | 0.66 | o | o | 33 |
| Control | 2.5 | 1 | 0.7 | 0.23 | 20 | 98.2 | 0.09 | x | x | 27 |

EXAMPLE 8

Various foaming solutions each containing the low-viscosity methyl cellulose of 400 cps, high-viscosity methyl cellulose of 8,000 cps, and the 90% saponified polyvinyl alcohol employed in Example 1, at the weight ratio of, by the order stated, 2.5 : 1 : 3, were prepared, the concentration of the foaming agent (sum of the foregoing three ingredients) being varied for each run as indicated in Table 6.

The property tests were performed similarly to Example 7 as to those samples, with the results as shown also in Table 6.

Table 6

| Concentration of Foaming Agent in Foaming Solution (%) | Foaming Property (1) | Foam Stability (%) | Foaming Agent per 100 Parts of Water in Slurry (part) | Slurry Stability | Product's Homogeneity | Compressive Strength (Kg/cm²) |
|---|---|---|---|---|---|---|
| 0.10 | 25 | 87.9 | 0.04 | 0 | 0 | 30 |
| 0.21 | 30 | 96.1 | 0.08 | 0 | 0 | 34 |
| 0.42 | 33 | 98.3 | 0.17 | 0 | 0 | 34 |
| 0.56 | 31 | 98.4 | 0.22 | 0 | 0 | 32 |
| 1.10 | 27 | 94.0 | 0.44 | 0 | 0 | 30 |

EXAMPLE 9

One-hundred (100) parts of portland cement, 20 parts of sand, 0.3 part of a low-viscosity methyl cellulose (400 cps), 0.13 parts of a high-viscosity methyl cellulose (8,000 cps), and 0.3 part of the same 90% saponified polyvinyl alcohol as that employed in Example 1, were thoroughly mixed for 5 minutes in a mortar mixer. Then 100 parts of water was added to the mixture, and the whole system was formed in a tank provided with the stirring blade, by rotating the blade for 5 minutes at a rate of 250 rpm. The foam-containing slurry which was formed contained, per 100 parts of water, 100 parts of portland cement and 0.73 part of the foaming agent.

The foam-containing slurry exhibited excellent slurry stability, in whih fine foams were uniformly and evenly distributed.

The foam-containing slurry was poured into a 10 $\phi$ × 60 cm cylindrical mold, and hardened. After ageing the hardened body at 20°C. and 65 % relative humidity for 28 days, it was observed that fine foams were uniformly distributed throughout the entire hardened body, and no substantial difference in specific gravity was recognized along the vertical direction of the molding. (The specific gravity at 10 cm below the top was 0.88, and that at 10 cm above the bottom was 0.90.) The hardened body had a compressive strength of 98 Kg/cm$^2$.

We claim:

1. A foam-containing slurry for making porous, inorganic construction material comprising 100 parts by weight of water [I], 35 to 350 parts by weight of hydraulic substance [II] selected from the group consisting of cement, siliceous sand and quicklime and mixtures thereof, and 0.02 to 1.20 parts of foaming agent [III], said foaming agent [III] comprising
    1. as the foaming component, 0.05 to 20 parts by weight of water-soluble, low-viscosity cellulose ether of which 2 weight % aqueous solution has a viscosity of 25 to 2,000 centipoises at 20° C.,
    2. as the foam stabilizer, 1 part by weight of water-soluble, high-viscosity cellulose ether of which 2 weight % aqueous solution has a viscosity exceeding 2,000 centipoises at 20° C., and
    3. as the foaming accelerator, at least 1 part by weight of at least 75% saponified polyvinyl alcohol of which 4 weight % aqueous solution has a viscosity of not higher than 70 centipoises at 20° C.

2. A foam-containing slurry for making porous, inorganic construction material, comprising 100 parts by weight of water [I], 35 to 350 parts by weight of hydraulic substance [II] selected from the group consisting of cement, siliceous sand and quicklime, and mixtures thereof, and 0.1 to 1.0 part by weight of foaming agent [III], said foaming agent [III] comprising
    1. as the foaming component, 0.1 to 10 parts by weight of a water soluble, low-viscosity cellulose ether of which 2 weight % aqueous solution has a viscosity of 25 to 2,000 centipoises at 20° C.,
    2. as the foam stabilizer, 1 part by weight of a water-soluble, high viscosity cellulose ether of which 2 weight % aqueous solution has a viscosity exceeding 4,000 centipoises at 20° C., and
    3. as the foaming accelerator, 1 to 30 parts by weight of at least 85% saponified polyvinyl alcohol of which 4 weight % aqueous solution has a viscosity of not higher than 70 centipoises at 20° C.

3. The foam-containing slurry of claim 1 wherein said foaming component (1) is selected from the group consisting of methyl cellulose, ethylmethyl cellulose, ethyl cellulose, hydroxyethylmethyl cellulose, hydroxypropyl methyl cellulose and hydroxyethylethyl cellulose.

4. The foam-containing slurry of claim 2 wherein said foaming component (1) is selected from the group consisting of methyl cellulose, hydroxyethylmethyl cellulose and hydroxypropylmethyl cellulose.

5. The foam-containing slurry of claim 1 wherein said foam stabilizer (2) is selected from the group consisting of methyl cellulose, ethylmethyl cellulose, ethyl cellulose, hydroxyethylmethyl cellulose, hydroxypropylmethyl cellulose, hydroxyethylethyl cellulose and carboxymethyl cellulose.

6. The foam-containing slurry of claim 2 wherein said foam stabilizer (2) is selected from the group consisting of methyl cellulose, hydroxyethylmethyl cellulose and hydroxypropylmethyl cellulose.

7. In a method for making a porous inorganic construction material by hardening a foam-containing slurry containing water, hydraulic substance selected from the group consisting of cement, siliceous sand and quicklime and mixtures thereof and foaming agent, the improvement comprising using as said foaming agent a foaming component, a foam stabilizer and foaming accelerator comprising
    1. as the foaming component, 0.05 to 20 parts by weight of water-soluble, low-viscosity cellulose of which 2 weight % aqueous solution has a viscosity of 25 to 2,000 centipoises at 20° C.,
    2. as the foam stabilizer, 1 part by weight of water-soluble, high-viscosity cellulose ether of which 2 weight % aqueous solution has a viscosity exceeding 2,000 centipoises at 20° C., and
    3. as the foaming accelerator, at least 1 part by weight of at least 75% saponified polyvinyl alcohol of which 4 weight % aqueous solution has a viscosity of not higher than 70 centipoises at 20° C.

8. The improved method of claim 7 wherein said foaming agent comprises
    1. as the foaming component, 0.1 to 10 parts by weight of a water soluble, low-viscosity cellulose ether of which 2 weight % aqueous solution has a viscosity of 25 to 2,000 centipoises at 20° C.,
    2. as the foam stabilizer, 1 part by weight of a water soluble, high viscosity cellulose ether of which 2 weight % aqueous solution has a viscosity exceeding 4,000 centipoises at 20° C., and
    3. as the foaming accelerator, 1 to 30 parts by weight of at least 85% saponified polyvinyl alcohol of which 4 weight % aqueous solution has a viscosity of not higher than 70 centipoises at 20° C.

9. The method of claim 7 wherein said foaming component (1) is selected from the group consisting of methyl cellulose, ethylmethyl cellulose, ethyl cellulose, hydroxyethylmethyl cellulose, hydroxypropyl methyl cellulose and hydroxyethylethyl cellulose.

10. The method of claim 8 wherein said foaming component (1) is selected from the group consisting of methyl cellulose, hydroxyethylmethyl cellulose and hydroxypropylmethyl cellulose.

11. The method of claim 9 wherein said foam stabilizer (2) is selected from the group consisting of methyl cellulose, ethylmethyl cellulose, ethyl cellulose, hydroxyethylmethyl cellulose, hydroxypropylmethyl cellulose, hydroxyethylethyl cellulose and carboxymethyl cellulose.

12. The method of claim 10 wherein said foam stabilizer (2) is selected from the group consisting of methyl cellulose, hydroxyethylmethyl cellulose and hydroxypropylmethyl cellulose.

* * * * *

UNITED STATES PATENT AND TRADEMARK OFFICE
CERTIFICATE OF CORRECTION

PATENT NO. : 3,963,507
DATED : June 15, 1976
INVENTOR(S) : Naoya Kuramoto, et al It is certified that error appears in the above-identified patent and that said Letters Patent are hereby corrected as shown below:

Claim 7, line 10, after "cellulose" insert -- ether --

Signed and Sealed this

Thirty-first Day of August 1976

[SEAL]

Attest:

RUTH C. MASON
Attesting Officer

C. MARSHALL DANN
Commissioner of Patents and Trademarks